(12) United States Patent
Muntz et al.

(10) Patent No.: US 12,117,030 B2
(45) Date of Patent: Oct. 15, 2024

(54) BLIND FASTENERS AND ASSOCIATED SYSTEMS

(71) Applicant: The Boeing Company, Chicago, IL (US)

(72) Inventors: Nathan A. Muntz, Everett, WA (US); Tanni Sisco, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/669,551

(22) Filed: Feb. 11, 2022

(65) Prior Publication Data
US 2023/0258216 A1 Aug. 17, 2023

(51) Int. Cl.
*F16B 19/10* (2006.01)
(52) U.S. Cl.
CPC .............................. *F16B 19/1036* (2013.01)
(58) Field of Classification Search
CPC . F16B 13/0808; F16B 19/109; F16B 19/1036
USPC .................................................. 411/340, 344
See application file for complete search history.

(56) References Cited

U.S. PATENT DOCUMENTS

| | | | | |
|---|---|---|---|---|
| 3,124,370 A | * | 3/1964 | Traugott .................. | B60G 7/02 403/372 |
| 4,411,570 A | * | 10/1983 | Juric ...................... | F16B 13/126 411/75 |
| 4,420,272 A | * | 12/1983 | Ingalls ................... | B62D 17/00 403/162 |
| 4,747,737 A | * | 5/1988 | Roffelsen ................ | F16B 19/02 248/70 |
| 4,968,055 A | * | 11/1990 | Reilly .................... | B62D 17/00 403/162 |
| 5,044,854 A | * | 9/1991 | Oh ....................... | F16B 13/0808 411/432 |
| 5,141,357 A | * | 8/1992 | Sherman ................. | F16B 5/025 403/4 |
| 5,655,864 A | * | 8/1997 | Haage .................... | F16B 13/12 403/208 |

(Continued)

OTHER PUBLICATIONS

NAS1329 and NAS1330 Rivnut® Fasteners, Liberty Engineering (2014). https://www.libertyeng.com/products/nas1329andnas1330rivnut/.

(Continued)

*Primary Examiner* — Sarang Afzali
*Assistant Examiner* — Darrell C Ford
(74) *Attorney, Agent, or Firm* — Walters & Wasylyna LLC

(57) ABSTRACT

A blind fastener includes a sleeve defining a sleeve central axis and having a sleeve shank having a distal end portion and a proximal end portion axially opposed from the distal end portion and a stop connected to the distal end portion of the sleeve shank. The sleeve defines an eccentric through-bore that extends along a through-bore axis from the proximal end portion to the distal end portion. The blind fastener includes a core bolt at least partially received in the eccentric through-bore of the sleeve, defining a core bolt central axis. A core bolt shank has a distal end portion, a proximal end portion axially opposed from the distal end portion, and a threaded portion. A core bolt head is connected to the proximal end portion of the core bolt shank. An eccentric nut is threaded into engagement with the threaded portion of the core bolt shank.

25 Claims, 10 Drawing Sheets

(56) References Cited

U.S. PATENT DOCUMENTS

| | | | | |
|---|---|---|---|---|
| 6,287,065 | B1* | 9/2001 | Berlin | F16B 37/041 |
| | | | | 411/340 |
| 7,037,027 | B2* | 5/2006 | Steinbeck | F16B 5/025 |
| | | | | 403/374.1 |
| 7,524,154 | B2 | 4/2009 | LaConte et al. | |
| 7,568,711 | B2* | 8/2009 | Houser | B62K 5/01 |
| | | | | 280/86.756 |
| 7,736,108 | B1* | 6/2010 | Bruce | F16B 13/0808 |
| | | | | 411/340 |
| 8,777,533 | B2 | 7/2014 | Hufnagl et al. | |
| 10,774,863 | B2 | 9/2020 | Simpson et al. | |
| 2004/0083586 | A1* | 5/2004 | Bentrim | F16B 19/109 |
| | | | | 24/458 |
| 2005/0117966 | A1* | 6/2005 | Steinbeck | F16B 5/025 |
| | | | | 403/408.1 |
| 2008/0253860 | A1* | 10/2008 | McDuff | F16B 13/003 |
| | | | | 411/340 |
| 2016/0138628 | A1* | 5/2016 | Niklewicz | F16B 21/00 |
| | | | | 411/57.1 |
| 2019/0331147 | A1* | 10/2019 | McDuff | F16B 13/002 |
| 2021/0016425 | A1* | 1/2021 | Niklewicz | F16B 13/0858 |

OTHER PUBLICATIONS

Blind Bolts, Monogram Aerospace Fasteners (2019). https://trsaero.com/monogramaerospace/products/blind-bolts/.

Ergo-Tech® Blind Fastening System, Howmet Aerospace (2021). https://catalog.howmetfasteners.com/category/fasteners.

* cited by examiner

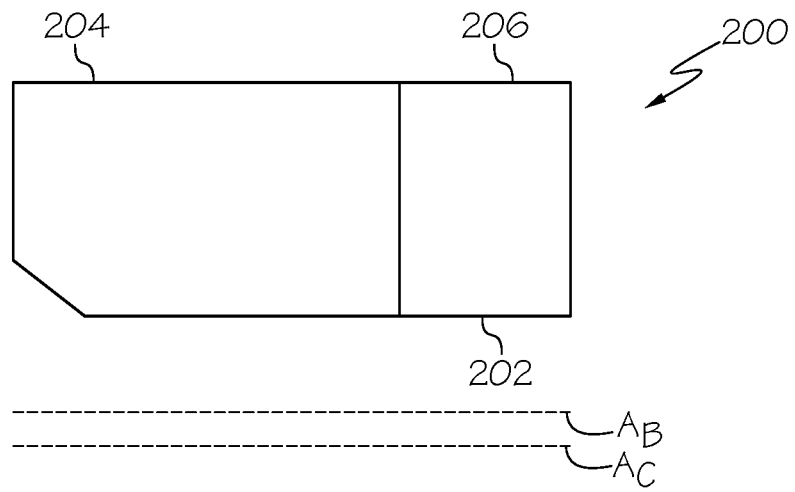
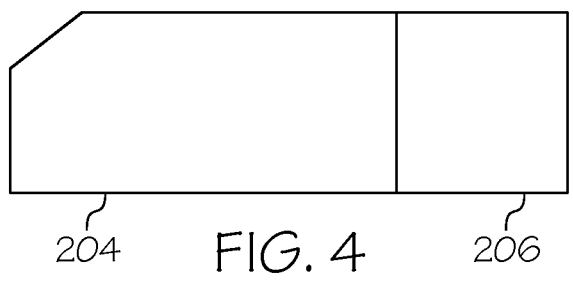
FIG. 4
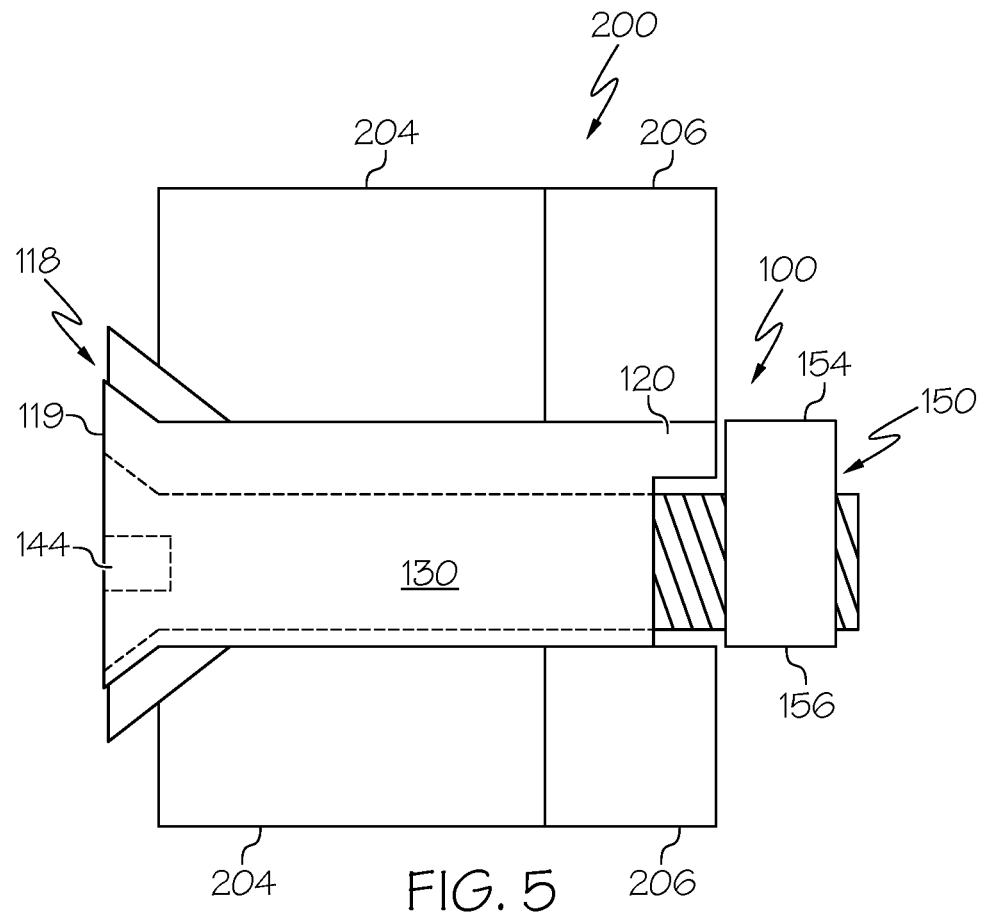
FIG. 5

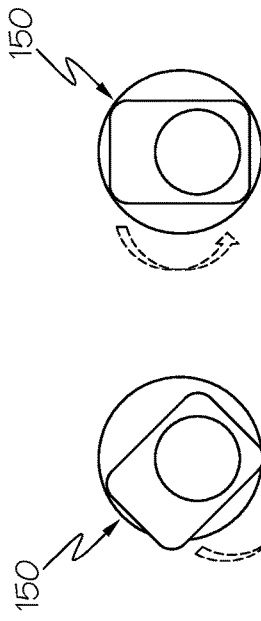
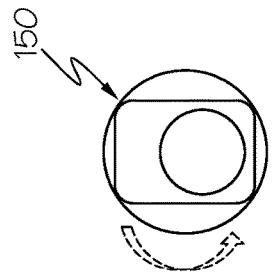
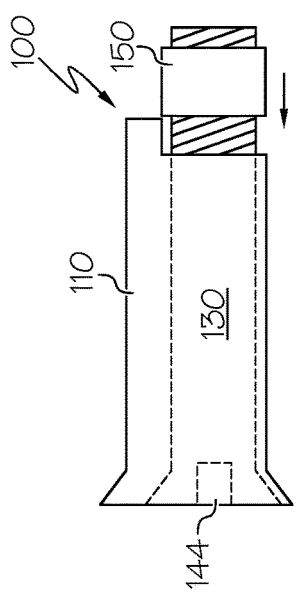
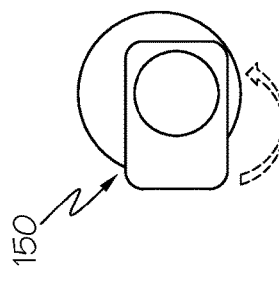
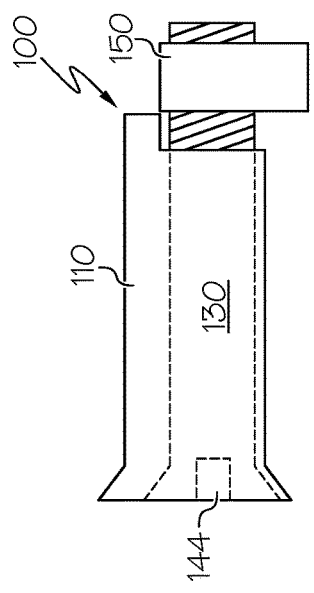
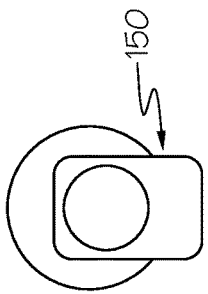
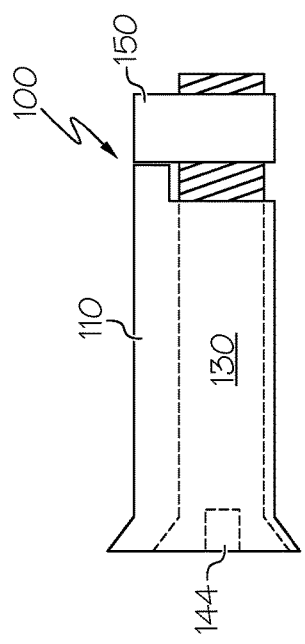

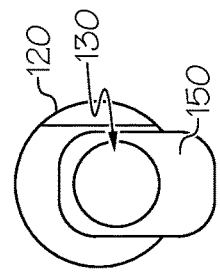
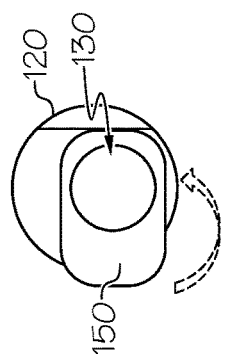
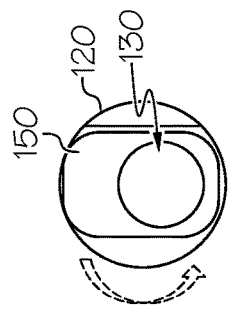
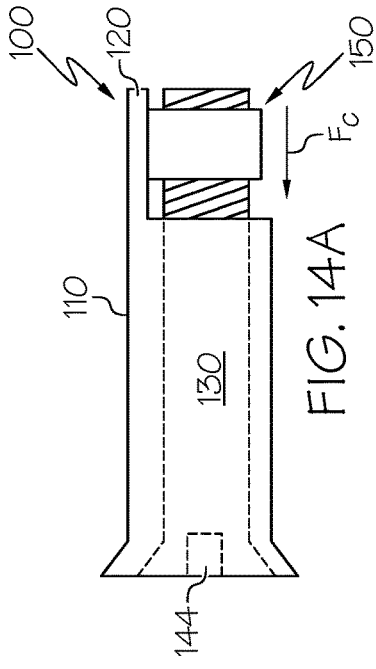
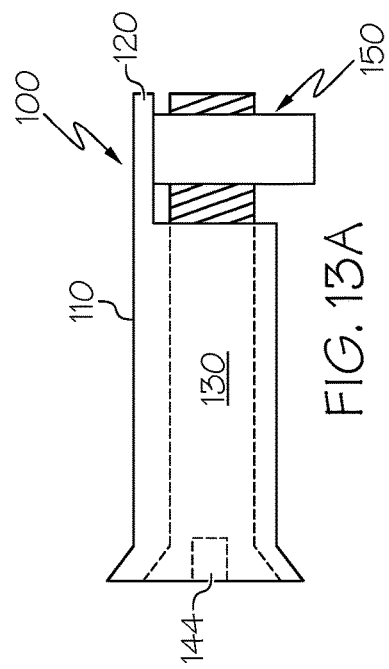
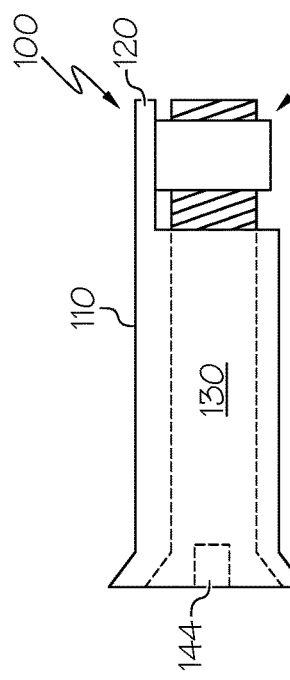

BLIND FASTENERS AND ASSOCIATED SYSTEMS

FIELD

This application relates to mechanical fasteners and, more particularly, to blind fasteners having an eccentric nut.

BACKGROUND

Mechanical fasteners are widely used for joining two or more components of a structural assembly. For example, mechanical fasteners are extensively used for joining the structural components of the airframe of an aircraft.

Blind fastener systems are a particular type of mechanical fastener. Blind fastener systems include a core bolt and a sleeve, wherein both the core bolt and the sleeve are inserted into an appropriate bore in a structural assembly and engage the structural assembly from just one side of the structural assembly, without the need for accessing the opposite side of the structural assembly. Therefore, blind fastener systems are particularly suitable for use in applications where access to one side of a structural assembly is difficult or unavailable.

Current tooling and installation methods for blind fastener systems utilize materials that change shape to form a nut or bulb for securing the blind fastener in place. Upon application of structural load, the materials may become weak and lead to failure of the blind fastener. Further, many current tooling and installation methods for blind fastener systems are typically quite complex, difficult to manufacture, and challenging to integrate with robotics. These systems specifically struggle with installation at varying (non-normal) angles, installation where sealant is required (which may adhere to, and subsequently jam or plug the internal drive mechanism of the nose piece), and reducing cost.

Accordingly, those skilled in the art continue with research and development efforts in the field of blind fastener systems.

SUMMARY

Disclosed are blind fasteners.

In one example, a blind fastener includes a sleeve defining a sleeve central axis. The sleeve includes a sleeve shank having a distal end portion and a proximal end portion axially opposed from the distal end portion and a stop connected to the distal end portion of the sleeve shank. The sleeve defines an eccentric through-bore that extends along a through-bore axis from the proximal end portion of the sleeve shank to the distal end portion of the sleeve shank. The blind fastener further includes a core bolt at least partially received in the eccentric through-bore of the sleeve, the core bolt defining a core bolt central axis. The core bolt includes a core bolt shank having a distal end portion, a proximal end portion axially opposed from the distal end portion, and a threaded portion between the distal end portion and the proximal end portion. The core bolt further includes a core bolt head connected to the proximal end portion of the core bolt shank. The blind fastener further includes an eccentric nut threaded into engagement with the threaded portion of the core bolt shank.

In another example, a blind fastener includes a sleeve defining an eccentric through-bore and having a stop. The blind fastener includes a core bolt at least partially received in the eccentric through-bore of the sleeve, the core bolt defining a core bolt central axis. The blind fastener further includes an eccentric nut threaded into engagement with the core bolt such that the eccentric nut initially rotates with the core bolt when the core bolt is rotated about the core bolt central axis in a tightening direction. After at least 90 degrees of rotation of the core bolt about the core bolt central axis in the tightening direction, the eccentric nut engages the stop. Further, after the eccentric nut engages the stop, further rotation of the core bolt about the core bolt central axis in the tightening direction causes axial movement of the eccentric nut along the core bolt central axis.

In another example, a blind fastener includes a sleeve having a sleeve shank, the sleeve shank having a proximal end portion and a distal end portion, wherein the proximal end portion has a sleeve head and the distal end portion has a stop, wherein the sleeve defines an eccentric through-bore that extends along a through-bore axis from the proximal end portion of the sleeve shank to the distal end portion of the sleeve shank. The blind fastener further includes a core bolt having a proximal end portion and a distal end portion, wherein the proximal end portion has a core bolt head and the distal end portion has an eccentric nut.

Also disclosed are methods for installing a blind fastener into a hole in a structure, the blind fastener having a sleeve defining an eccentric through-bore and comprising a stop, a core bolt at least partially received in the eccentric through-bore of the sleeve, the core bolt defining a core bolt central axis, and an eccentric nut threaded into engagement with the core bolt.

In one example, the method includes inserting the blind fastener into the hole and rotating the core bolt about the core bolt central axis in a tightening direction.

Also disclosed are methods for one-sided binding of at least two members to be sandwiched together with a blind fastener, the blind fastener comprising a sleeve having a sleeve head, the sleeve defining an eccentric through-bore and comprising a stop, a core bolt having a core bolt head, the core bolt at least partially received in the eccentric through-bore of the sleeve, the core bolt defining a core bolt central axis, and an eccentric nut threaded into engagement with the core bolt.

Also disclosed are systems for installing a blind fastener into a hole in a structure.

In one example, the system includes a blind fastener. The blind fastener includes a sleeve defining an eccentric through-bore and having a stop, a core bolt at least partially received in the eccentric through-bore of the sleeve, the core bolt defining a core bolt central axis, and an eccentric nut threaded into engagement with the core bolt such that the eccentric nut initially rotates with the core bolt when the core bolt is rotated about the core bolt central axis in a tightening direction. The system further includes a tool for engaging the blind fastener.

In one example, the method includes inserting the blind fastener into the hole and rotating the core bolt about the core bolt central axis in a tightening direction to sandwich the at least two members between the sleeve head and the eccentric nut, wherein the sleeve head is clamped against a proximal end portion of the sleeve and the eccentric nut is clamped against a distal end portion of the sleeve upon rotating.

Also disclosed are methods for applying a clamping force on at least two members with a blind fastener, the blind fastener having a sleeve having a sleeve head, the sleeve defining an eccentric through-bore and comprising a stop, a core bolt having a core bolt head, the core bolt at least partially received in the eccentric through-bore of the sleeve, the core bolt defining a core bolt central axis, and an eccentric nut threaded into engagement with the core bolt.

In one example, the method includes inserting the blind fastener into the hole. The method further includes rotating the core bolt about the core bolt central axis in a tightening direction, wherein the sleeve head is clamped against a proximal end portion of the sleeve and the eccentric nut is clamped against a distal end portion of the sleeve upon rotating. The method further includes applying the clamping force on the at least two members between the sleeve head and the eccentric nut.

Other examples of the disclosed blind fasteners and associated methods for installing blind fasteners will become apparent from the following detailed description, the accompanying drawings, and the appended claims.

BRIEF DESCRIPTION OF THE DRAWINGS

FIG. 4 is a cross-sectional side view of a portion of the blind fastener of FIG. 1A in a structure;
FIG. 5 is a cross-sectional side view of the blind fastener of FIG. 1A in a structure;
FIG. 7A is a cross-sectional side view of a blind fastener in an initial position;
FIG. 7B is a top view of the blind fastener of FIG. 7A rotated 45°;
FIG. 7C is a top view of the blind fastener of FIG. 7A rotated 90°;
FIG. 8A is a cross-sectional side view of the blind fastener of FIG. 7A rotated 90°;
FIG. 8B is a top view of the blind fastener of FIG. 8A;
FIG. 9A is cross-sectional side view of the blind fastener of FIG. 8A rotated 90°;
FIG. 9B is a top view of the blind fastener of FIG. 9A;
FIG. 12A is a cross-sectional side view of a blind fastener in an initial position;
FIG. 12B is a top view of the blind fastener of FIG. 12A;
FIG. 13A is a cross-sectional side view of the blind fastener of FIG. 12A rotated 90°;
FIG. 13B is a top view of the blind fastener of FIG. 13A;
FIG. 14A is a cross-sectional side view of the blind fastener of FIG. 13A rotated 90°;
FIG. 14B is a top view of the blind fastener of FIG. 14A.

DETAILED DESCRIPTION

Figure 1A:
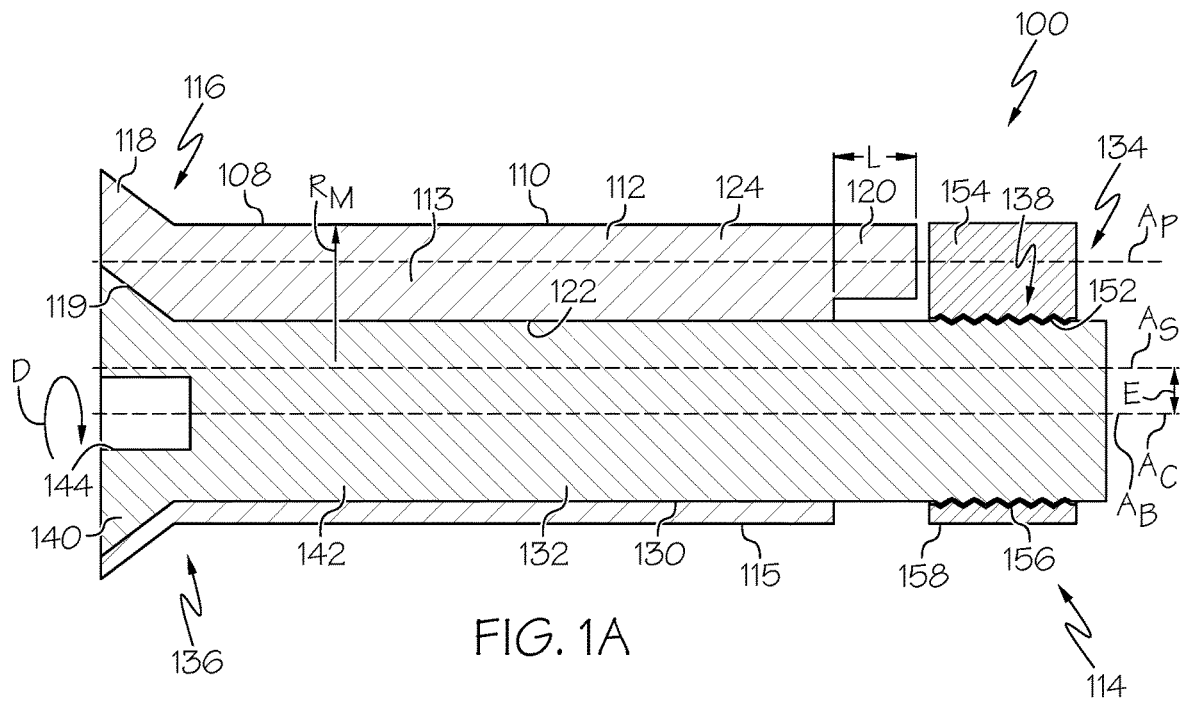
FIG. 1A is a cross-sectional side view of a blind fastener.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

References throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

Referring generally to FIGS. 1A-14B, disclosed is a blind fastener 100. The blind fastener 100 includes offset, or eccentric features to eliminate the need for softened materials and/or annealed materials that buckle during installation. The blind fastener 100 includes a sleeve 110. The sleeve 110 defines a sleeve central axis $A_S$ and includes a sleeve shank 112. The sleeve shank 112 has a distal end portion 114 and a proximal end portion 116 axially opposed from the distal end portion 114. The sleeve 110 further includes a stop 120 connected to the distal end portion 114 of the sleeve shank 112. In one or more examples, the sleeve 110 defines an eccentric through-bore 122 that extends along a through-bore axis $A_B$ from the proximal end portion 116 of the sleeve shank 112 to the distal end portion 114 of the sleeve shank 112. In one example, the sleeve 110 is a single monolithic structure such that the sleeve shank 112 and stop 120 are integral.

Figure 1B:
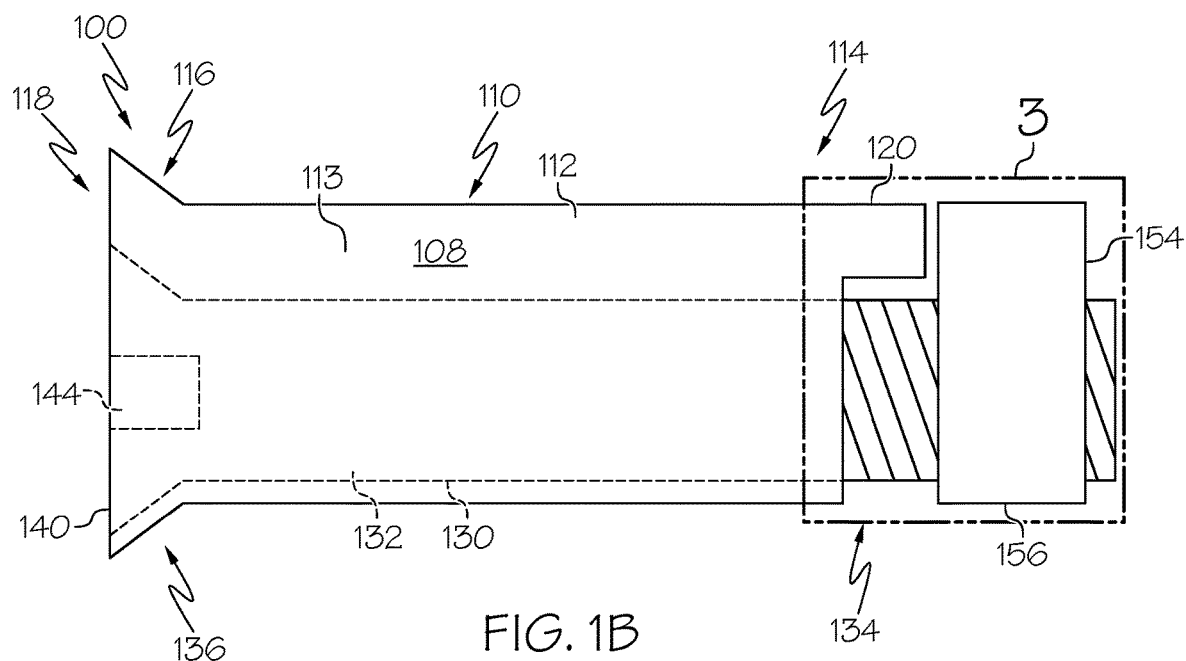
FIG. 1B is a cross-sectional side view of the blind fastener of FIG. 1A.
Figure 2:
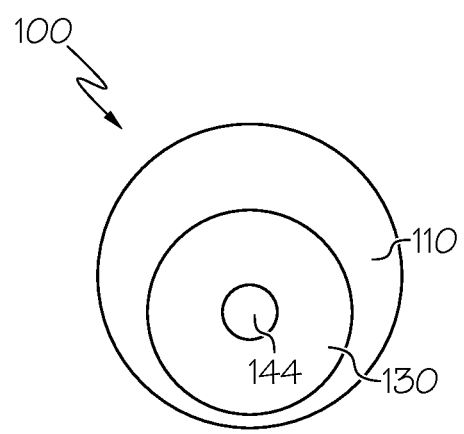
FIG. 2 is a top view of the blind fastener of FIG. 1A.
Figure 3:
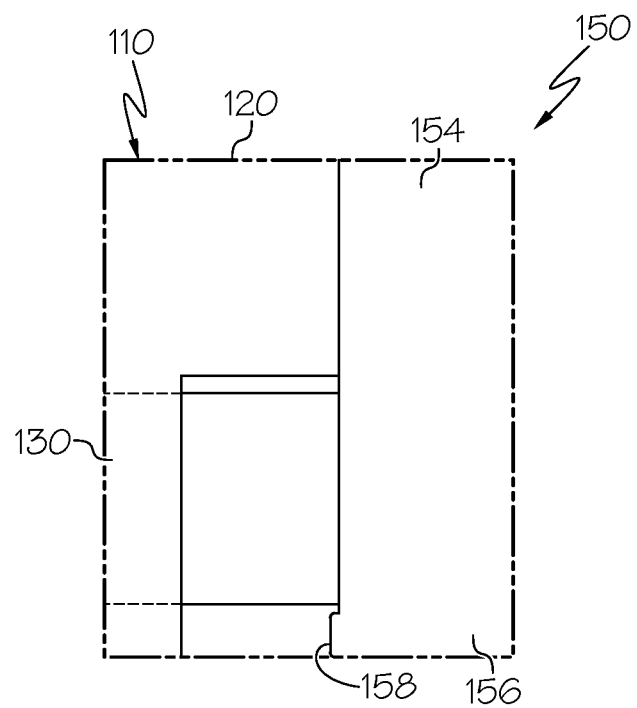
FIG. 3 is a cross-sectional side view of a portion of the blind fastener of FIG. 1B.

Referring to FIG. 1A and FIG. 1B, the blind fastener 100 further includes a core bolt 130 at least partially received in the eccentric through-bore 122 of the sleeve 110. The core bolt 130 defines a core bolt central axis $A_C$. The core bolt 130 includes a core bolt shank 132 having a distal end portion 134, a proximal end portion 136 axially opposed from the distal end portion 134, and a threaded portion 138 between the distal end portion 134 and the proximal end portion 136. The core bolt 130 further includes a core bolt head 140 connected to the proximal end portion 136 of the core bolt shank 132 and an eccentric nut 150 threaded into engagement with the threaded portion 138 of the core bolt shank 132. The core bolt 130 may be eccentrically positioned relative to the sleeve 110, see FIG. 2.

The sleeve 110 may include any material suitable for the intended application, such as a material capable of carrying a heavy mechanical load. In one example, the sleeve 110 comprises a metallic material. In another example, the sleeve 110 comprises one or more of a ferrous material, a non-ferrous material, titanium, aluminum, bronze, copper, beryllium, nickel, tin, and Inconel. In another non-limiting example, the sleeve 110 comprises one or more of A286, 15-5PH, and Inconel 718.

In one example, the through-bore axis $A_B$ is substantially parallel with the sleeve central axis $A_S$ of the sleeve 110. In another example, the through-bore axis $A_B$ is laterally displaced from the sleeve central axis $A_S$ of the sleeve 110 by a distance E of at least 0.5 mm. In one or more examples, the core bolt central axis $A_C$ of the core bolt 130 is substantially aligned with the through-bore axis $A_B$, see FIG. 1A.

Referring to FIG. 1A, in one or more examples, the stop 120 axially protrudes from the distal end portion 114 of the sleeve shank 112 along a protruding axis $A_P$ that is substantially parallel with the through-bore axis $A_B$. In another example, as illustrated in FIG. 1A, the stop 120 has a protruding length L along the protruding axis $A_P$, and wherein the protruding length L is at least 1 mm. The stop 120 prevents the eccentric nut 150 from over-rotating, thus preventing rotation of 360°.

Referring to FIG. 1B, the eccentric through-bore 122 defines a cross-sectionally thicker wall portion 113 of the sleeve shank 112 and a cross-sectionally thinner wall portion 115 of the sleeve shank 112, and wherein the stop 120 is connected to the cross-sectionally thicker wall portion 113 of the sleeve shank 112. In one example, the sleeve shank 112 and the stop 120 comprise a single monolithic body 124.

Referring to FIG. 1A, in one or more examples, the sleeve 110 may include a sleeve head 118 connected to the proximal end portion 116 of the sleeve shank 112. In one example, the core bolt head 140 of the core bolt 130 is in abutting engagement with the sleeve head 118 of the sleeve 110. In another example, the sleeve shank 112, the sleeve head 118, and the stop 120 comprise a single monolithic body 124. Still referring to FIG. 1A, in one example the sleeve head 118 defines a countersink 119. The core bolt head 140 of the core bolt 130 may be shaped and sized to be received in the countersink 119.

Figure 15A:
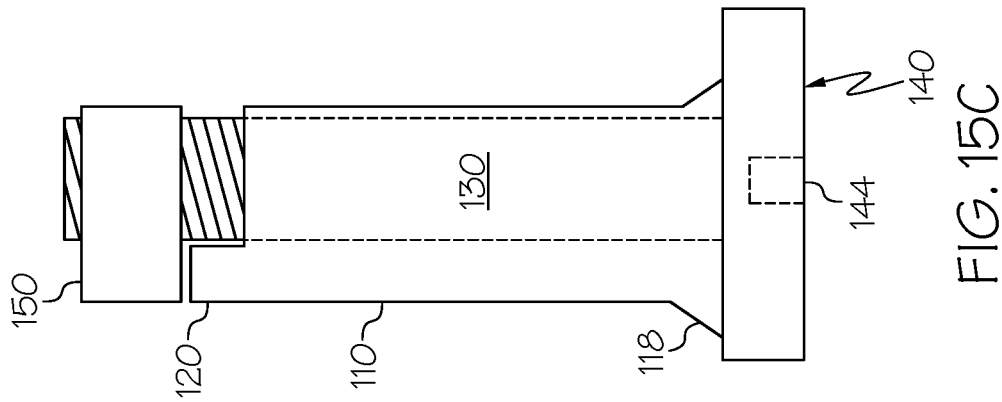
FIG. 15A is a cross-sectional side view of a blind fastener.
Figure 15B:
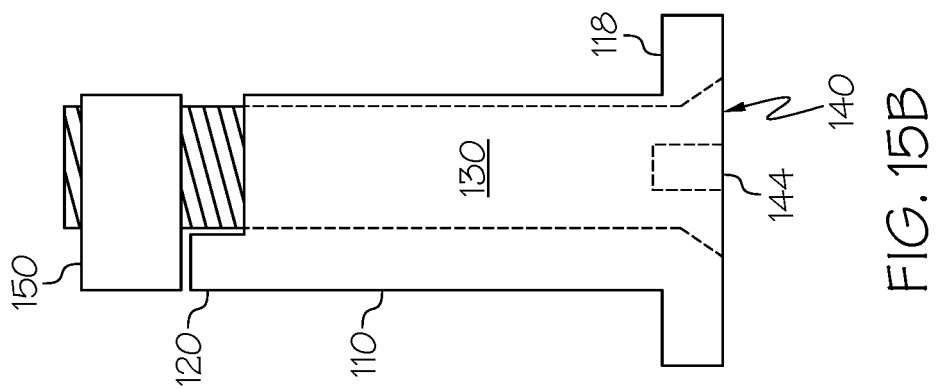
FIG. 15B is a cross-sectional side view of a blind fastener.
Figure 15C:
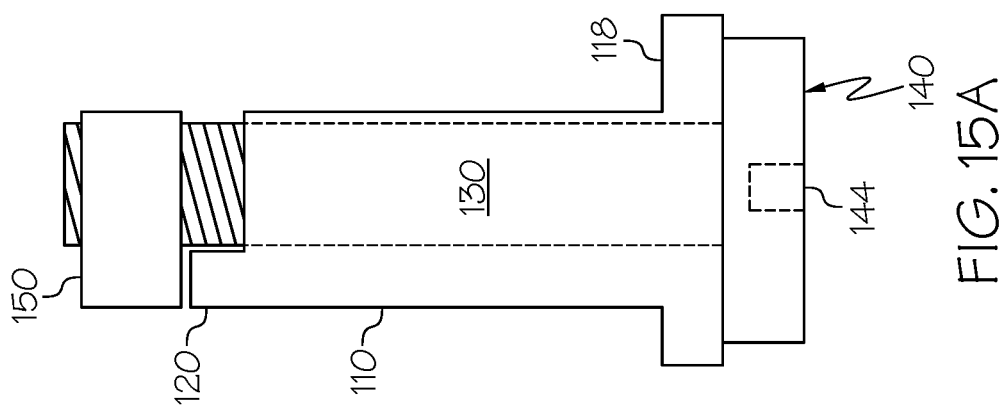
FIG. 15C is a cross-sectional side view of a blind fastener.
Figure 16A:
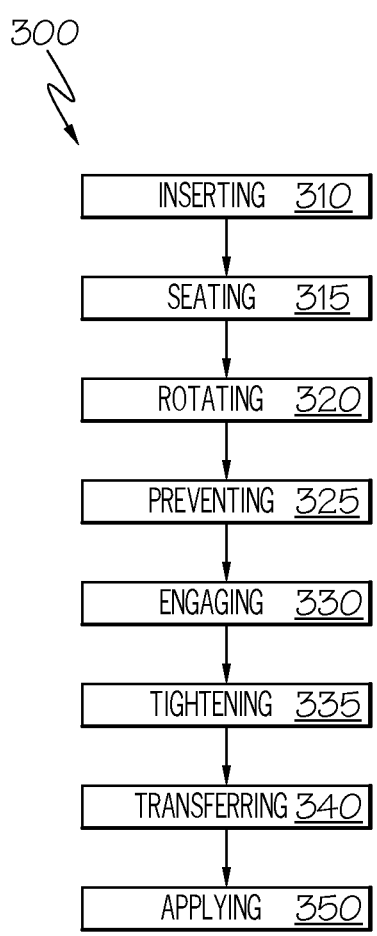
FIG. 16A is a flow diagram of a method for installing a blind fastener into a hole in a structure.
Figure 16B:
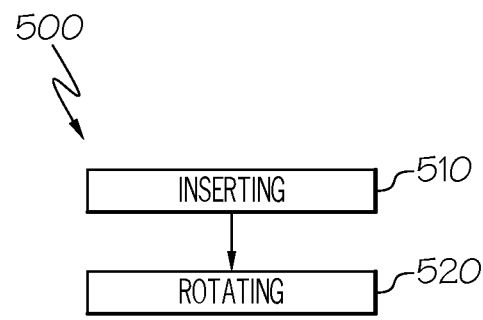
FIG. 16B is a flow diagram of a method for installing a blind fastener into a hole in a structure.

Referring to FIGS. 15A, 16B, and 15C, in one or more examples, sleeve head 118 is a crowned sleeve head and the core bolt head 140 is a countersunk core bolt head. In another example, the sleeve head (118) is a crowned sleeve head and the core bolt head (140) is a crowned core bolt head. In yet another example, the sleeve head (118) is a countersunk sleeve head and the core bolt head (140) is a countersunk core bolt head.

In one example, when the eccentric nut 150 is stopped against the stop 120, a portion of the eccentric nut 150 retains the sleeve 110 between the eccentric nut 150 and the sleeve head 118. Therefore, the sleeve head 118 and the eccentric nut 150 retain the sleeve 110 and the core bolt 130. In one example, the countersunk end holds the sleeve head 118 end of the sleeve 110 and the core bolt 130 while the eccentric nut 150 holds the other end of the sleeve 110.

The core bolt 130 may include any material suitable for the intended application, such as a material capable of carrying a heavy mechanical load. In one example, the core bolt 130 comprises a metallic material. In another example, the core bolt 130 comprises one or more of a ferrous material, a non-ferrous material, titanium, aluminum, bronze, copper, beryllium, nickel, tin, and Inconel. In another non-limiting example, the core bolt 130 comprises one or more of A286, 15-5PH, and Inconel 718. In yet another example, the core bolt 130 is compositionally different than the sleeve 110.

Referring to FIG. 1B, in one or more examples, the core bolt shank 132 and the core bolt head 140 comprise a single monolithic body 142. Referring to FIG. 1A, the threaded portion 138 of the core bolt shank 132 may extend to the distal end portion 134 of the core bolt shank 132.

Referring to FIG. 1A and FIG. 1B, the core bolt 130 may further include a torquing feature 144 associated with the core bolt head 140. In one or more examples, the torquing feature 144 is recessed into the core bolt head 140. The torquing feature 144 may be sized and shaped for engagement with a tool 160. In one example, the torquing feature 144 is threaded for threaded engagement with a tool 160. Upon rotation of the tool 160, the eccentric nut 150 is configured to engage with a structure 200, see FIG. 4.

The eccentric nut 150 may include any material suitable for the intended application, such as a material capable of carrying a heavy mechanical load. In one example, the core bolt 130 comprises a metallic material. In another example, the eccentric nut 150 comprises one or more of a ferrous material, a non-ferrous material, titanium, aluminum, bronze, copper, beryllium, nickel, tin, and Inconel. In another non-limiting example, the core bolt 130 comprises one or more of A286, 15-5PH, and Inconel 718. In yet another example, the eccentric nut 150 is compositionally different than one or more of the core bolt 130 is and the sleeve 110.

Referring to FIG. 1B, in one or more examples, the eccentric through-bore 122 defines a cross-sectionally thicker wall portion 113 of the sleeve shank 112 and a cross-sectionally thinner wall portion 115 of the sleeve shank 112. As illustrated in FIG. 1A, the eccentric nut 150 may define a threaded through-bore 152. In one example, the threaded through-bore 152 defines a cross-sectionally thicker wall portion 154 of the eccentric nut 150 and a cross-sectionally thinner wall portion 156 of the eccentric nut 150.

Referring to FIG. 1B and FIG. 5, when the eccentric nut 150 is in an initial configuration, the cross-sectionally thicker wall portion 154 of the eccentric nut 150 is substantially aligned with the cross-sectionally thicker wall portion 113 of the sleeve shank 112. In on example, the eccentric nut 150 may further include a secondary stop 158, see FIG. 1A and FIG. 3. The secondary stop 158 may be connected to the cross-sectionally thinner wall portion 156 of the eccentric nut 150.

Referring to FIG. 1A, in one or more examples, an external surface 108 of the sleeve shank 112 of the sleeve 110 defines a maximum radius $R_M$ with respect to the sleeve central axis $A_S$ of the sleeve 110. In this example, when the eccentric nut 150 is in an initial configuration, the eccentric nut 150 is contained within the maximum radius $R_M$. Further, when the eccentric nut 150 is in a deployed configuration, a portion of the eccentric nut 150 protrudes outside of the maximum radius $R_M$.

In one example, the portion of the eccentric nut 150 that protrudes outside of the maximum radius $R_M$ when the eccentric nut 150 is in a deployed configuration protrudes at least 4 mm beyond the maximum radius $R_M$.

Referring to FIGS. 7A-9B, in one or more examples, the eccentric nut 150 is threaded into engagement with the threaded portion 138 of the core bolt shank 132 such that the eccentric nut 150 initially rotates with the core bolt 130 when the core bolt 130 is rotated about the core bolt central axis $A_C$ in a tightening direction D. After at least 45 degrees of rotation of the core bolt 130 about the core bolt central axis $A_C$ in the tightening direction D, see FIG. 7B, the eccentric nut 150 may engage the stop 120 connected to the distal end portion 114 of the sleeve shank 112, see FIG. 7A. Still referring to FIGS. 7A-9B, in one or more examples, after at least 90 degrees, FIG. 7B, and at most 720 degrees of rotation of the core bolt 130 about the core bolt central axis $A_C$ in the tightening direction D, the eccentric nut 150 engages the stop 120 connected to the distal end portion 114 of the sleeve shank 112.

After the eccentric nut 150 engages the stop 120, further rotation of the core bolt 130 about the core bolt central axis $A_C$ in the tightening direction D causes axial movement of the eccentric nut 150 toward the core bolt head 140 along the core bolt central axis $A_C$, see FIGS. 12A-14B. The stop 120 prevents the eccentric nut 150 from spinning a complete 360° during rotation of the core bolt 130 about the core bolt central axis $A_C$ in the tightening direction D.

Other examples of a blind fastener 100 are described below. The blind fastener 100 utilizes offset, or eccentric features to eliminate the need for softened materials or annealed materials that buckle during installation. Referring to FIG. 1A and FIG. 1B, disclosed is a blind fastener 100. The blind fastener includes a sleeve 110. The sleeve 110 defines an eccentric through-bore 122 and includes a stop 120. The blind fastener 100 further includes a core bolt 130 at least partially received in the eccentric through-bore 122 of the sleeve 110. The core bolt 130 defines a core bolt central axis $A_C$.

Still referring to FIG. 1A, the core bolt 130 further includes an eccentric nut 150 threaded into engagement with the core bolt 130 such that the eccentric nut 150 initially rotates with the core bolt 130 when the core bolt 130 is rotated about the core bolt central axis $A_C$ in a tightening direction D. In one example, after at least 90 degrees of rotation of the core bolt 130 about the core bolt central axis $A_C$ in the tightening direction D, the eccentric nut 150 engages the stop 120, see FIG. 7A. Upon the eccentric nut 150 engaging the stop 120, the eccentric nut 150 retains the sleeve 110 between the eccentric nut 150 and the sleeve head 118. Further, after the eccentric nut 150 engages the stop 120, further rotation of the core bolt 130 about the core bolt central axis $A_C$ in the tightening direction D causes axial movement of the eccentric nut 150 along the core bolt central axis $A_C$, see FIG. 12A. Accordingly, as the core bolt 130 tightens within the structure 200, the sleeve 110 is sandwiched therebetween.

Figure 10:
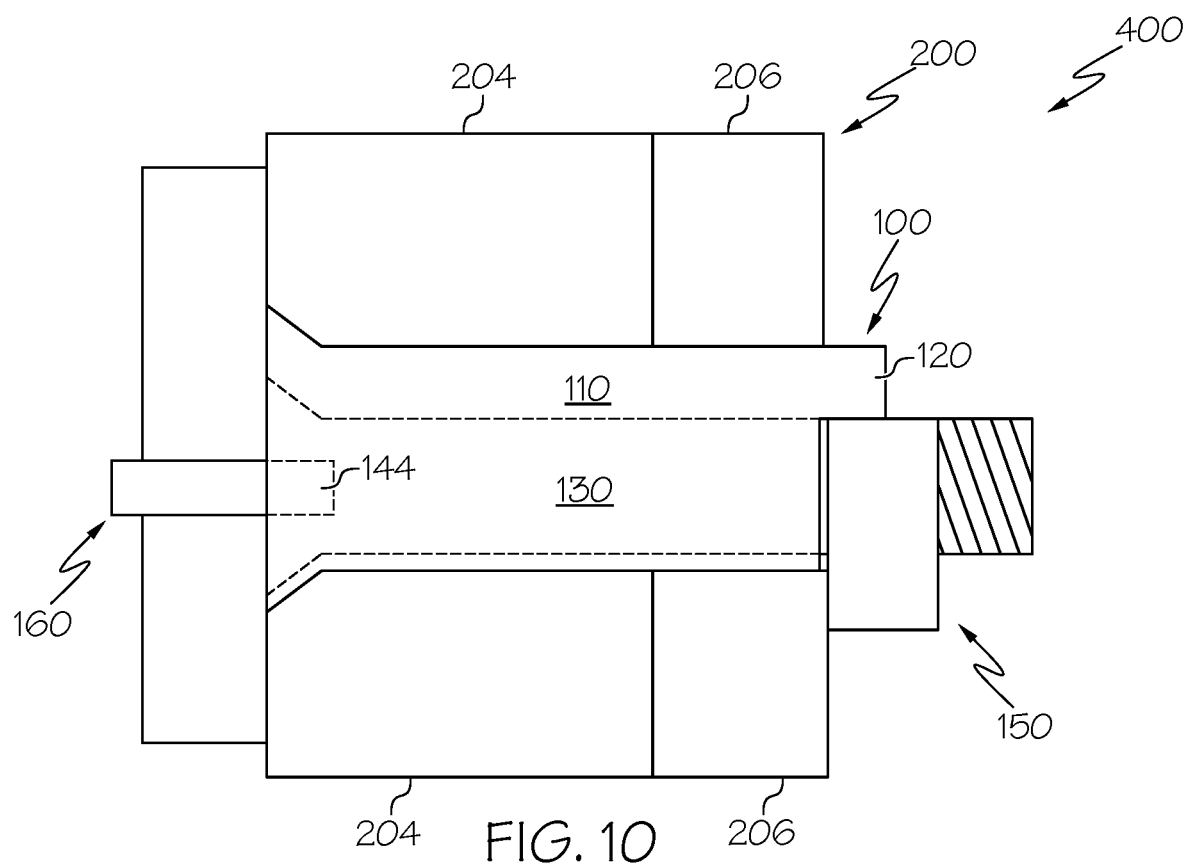
FIG. 10 is a cross-sectional side view of the blind fastener of FIG. 1A in a structure.

Referring to FIG. 10, disclosed is a system 400 for installing a blind fastener 100 into a hole 202 in a structure 200. The system 400 includes a blind fastener 100 comprising a sleeve 110 defining an eccentric through-bore 122. The blind fastener further includes a stop 120 and a core bolt 130 at least partially received in the eccentric through-bore 122 of the sleeve 110, the core bolt 130 defining a core bolt central axis $A_C$. The blind fastener further includes an eccentric nut 150 threaded into engagement with the core bolt 130 such that the eccentric nut 150 initially rotates with the core bolt 130 when the core bolt 130 is rotated about the core bolt central axis $A_C$ in a tightening direction D. the system 400 further includes a tool 160 for engaging the blind fastener 100.

Referring to FIG. 16A, disclosed is a method 300 for installing a blind fastener 100 into a hole 202 in a structure 200, see FIG. 4. The blind fastener 100 includes a sleeve 110 defining an eccentric through-bore 122 and comprising a stop 120. The blind fastener 100 further includes a core bolt 130 at least partially received in the eccentric through-bore 122 of the sleeve 110. The core bolt 130 defines a core bolt central axis $A_C$ and an eccentric nut 150 threaded into engagement with the core bolt 130. Still referring to FIG. 15, the method 300 includes inserting 310 the blind fastener 100 into the hole 202.

In one or more examples, the method 300 includes rotating 320 the core bolt 130 about the core bolt central axis $A_C$ in a tightening direction D, see FIG. 1A. In one example, the rotating 320 the core bolt 130 further includes transferring 340 torque from the tool 160 (FIG. 6) to the core bolt 130. In another example, the rotating 320 the core bolt 130 initially causes the eccentric nut 150 to rotate with the core bolt 130, see FIGS. 7A, 7B, 7C, 8A, 8B, 9A and 9B. Upon rotation of the tool 160, the eccentric nut 150 engages with the structure 200.

In yet another example, after at least 45 degrees of the rotating 320 the core bolt 130, FIG. 7B, the eccentric nut 150 engages the stop 120. Upon the eccentric nut 150 engaging the stop 120, the eccentric nut 150 retains the sleeve 110 between the eccentric nut 150 and the sleeve head 118. Additionally, after the eccentric nut 150 engages the stop 120 (FIG. 3 and FIG. 7A), further rotation of the core bolt 130 about the core bolt central axis $A_C$ in the tightening direction D may cause axial movement of the eccentric nut 150 along the core bolt central axis $A_C$. The rotating 320 the core bolt 130 may cause clamping Fc of the structure 200 between the sleeve 110 and the eccentric nut 150, see FIG. 11 and progression of clamping Fc or sandwiching in FIGS. 12A, 12B, 13A, 13B, 14A and 14B. As illustrated in those series of figures, the nut continues moving toward engagement with the eccentric nut 150 and applies clamping $F_C$ force. Full installation may occur when the core bolt 130 is tightened to the desired torque.

Figure 11:
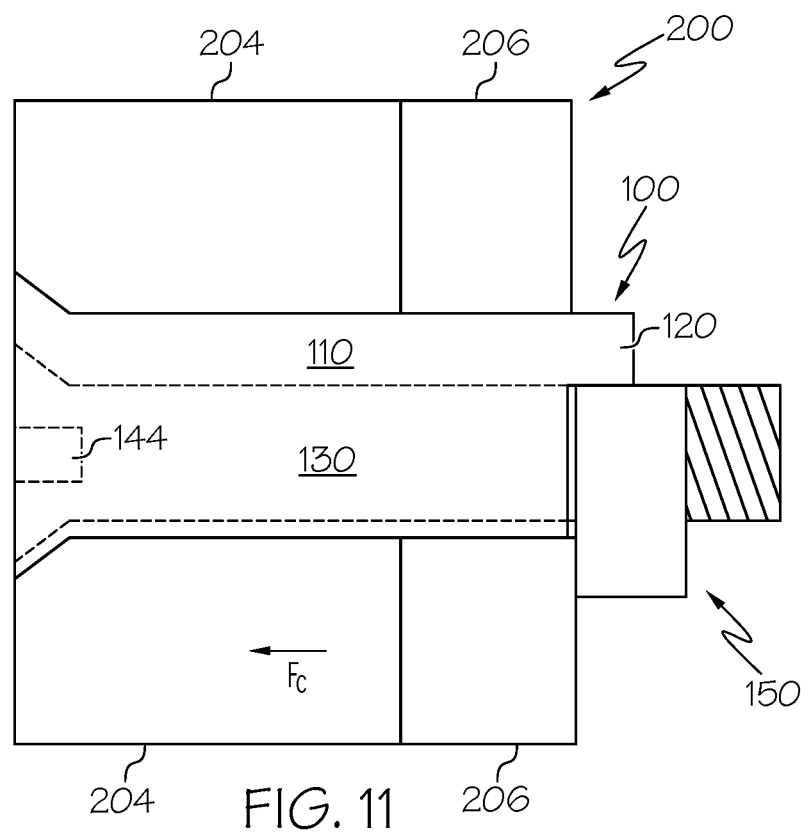
FIG. 11 is cross-sectional side view of the blind fastener of FIG. 1A in a structure.

Referring to FIG. 10 and FIG. 11, the core bolt 130 comprises a torquing feature 144. Referring to FIG. 15, in one example, the method 300 may include, during the rotating 320 the core bolt 130, applying 350 an axial bearing force F to the sleeve 110 of the blind fastener 100 to axially retain the sleeve 110 against the structure 200, see FIG. 6. The axial force F may be applied via tool 160 upon engagement with torquing feature 144. In one or more examples, the rotating 320 the core bolt 130 may include engaging 330 the torquing feature 144 with tool 160, see FIG. 10. In one example, the tool 160 may threadedly engage with the torquing feature 144.

Referring to FIG. 16A, the method 300 may further include seating 315 a countersink 119 portion of the sleeve 110 into a countersunk portion of the hole 202. The method 300 may further include preventing 325 rotation of the eccentric nut 150 during the rotating 320. The preventing 325 may be achieved by the stop 120 of the sleeve 110. In one or more examples, the method 300 may further include tightening 335 the blind fastener 100 until a desired torque is achieved.

Figure 6:
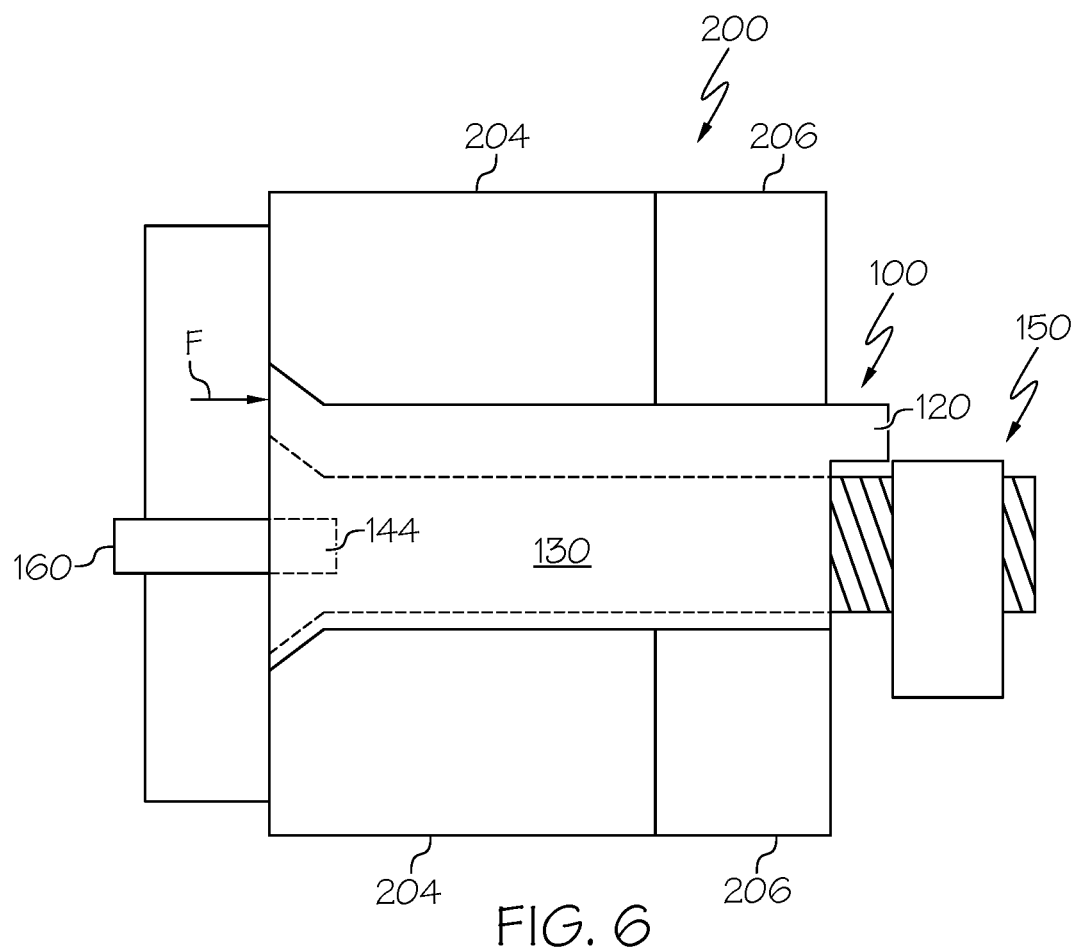
FIG. 6 is a cross-sectional side view of the blind fastener of FIG. 1A in a structure.

The structure 200 of the method 300 includes at least a first member 204 and a second member 206, see FIG. 5 and FIG. 6. Further, in one example, at least one of the first member 204 and the second member 206 comprises a composite material. In another example, both the first member 204 and the second member 206 comprise a composite material. In yet another example, at least one of the first member 204 and the second member 206 comprises a composite material and the other comprises a metallic material.

Referring to FIG. 16B, disclosed is a method 500 for one-sided binding of at least two members 204, 206 to be sandwiched together with a blind fastener, the blind fastener 100 comprising a sleeve 110 having a sleeve head 118, the sleeve 110 defining an eccentric through-bore 122 and comprising a stop 120, a core bolt 130 having a core bolt head 140, the core bolt 130 at least partially received in the eccentric through-bore 122 of the sleeve 110, the core bolt 130 defining a core bolt central axis $A_C$, and an eccentric nut 150 threaded into engagement with the core bolt 130. The method 500 include inserting 510 the blind fastener 100 into the hole 202.

Still referring to FIG. 16B, the method 500 includes rotating 520 the core bolt 130 about the core bolt central axis $A_C$ in a tightening direction D to sandwich the at least two members 204, 206 between the sleeve head 118 and the eccentric nut 150, wherein the sleeve head 118 is clamped against a proximal end portion 116 of the sleeve 110 and the eccentric nut 150 is clamped against a distal end portion 114 of the sleeve 110 upon rotating 520. In one example, the rotating 520 causes a clamping force Fc provided by the sleeve head 118 and core bolt head 140 at the proximal end portion 116 and the eccentric nut 150 at the distal end portion 114.

In one or more examples, the rotating 520 the core bolt 130 initially causes the eccentric nut 150 to rotate with the core bolt 130. Further, upon the eccentric nut 150 engaging the stop 120, the eccentric nut 150 retains the sleeve 110 between the eccentric nut 150 and a sleeve head 118 of the sleeve 110.

Figure 16C:
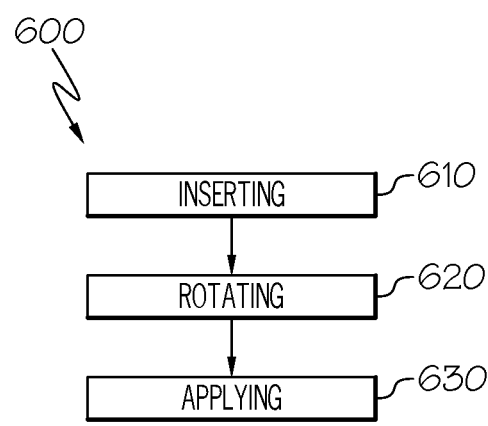
FIG. 16C flow diagram of a method for installing a blind fastener into a hole in a structure.

Referring to FIG. 16C, A method 600 for applying a clamping force Fc on at least two members 204, 206 with a blind fastener, the blind fastener 100 comprising a sleeve 110 having a sleeve head 118, the sleeve 110 defining an eccentric through-bore 122 and comprising a stop 120, a core bolt 130 having a core bolt head 140, the core bolt 130 at least partially received in the eccentric through-bore 122 of the sleeve 110, the core bolt 130 defining a core bolt central axis $A_C$, and an eccentric nut 150 threaded into engagement with the core bolt 130 is disclosed. The method 600 includes inserting 610 the blind fastener 100 into the hole 202.

The method 600 further includes rotating 620 the core bolt 130 about the core bolt central axis $A_C$ in a tightening direction D, wherein the sleeve head 118 is clamped against a proximal end portion 116 of the sleeve 110 and the eccentric nut 150 is clamped against a distal end portion 114 of the sleeve 110 upon rotating 620.

The method 600 further includes applying 630 the clamping force Fc on the at least two members 204, 206 between the sleeve head 118 and the eccentric nut 150. In one example, upon the eccentric nut 150 engaging the stop 120, the eccentric nut 150 retains the sleeve 110 between the eccentric nut 150 and a sleeve head 118 of the sleeve 110. In another example, the sleeve head 118 defines a countersink 119, and the core bolt head 140 of the core bolt 130 is received in the countersink 119.

Also disclosed is a blind fastener 100. The blind fastener 100 includes a sleeve 110 having a sleeve shank 112, the sleeve shank 112 having a proximal end portion 116 and a distal end portion 114, wherein the proximal end portion 116 has a sleeve head 118 and the distal end portion 114 has a stop 120, wherein the sleeve 110 defines an eccentric through-bore 122 that extends along a through-bore axis $A_B$ from the proximal end portion 116 of the sleeve shank 112 to the distal end portion 114 of the sleeve shank 112.

The blind fastener 100 further includes a core bolt 130 having a proximal end portion 136 and a distal end portion 134, wherein the proximal end portion 136 has a core bolt head 140 and the distal end portion 134 has an eccentric nut 150. In one example, the sleeve head 118 defines a countersink 119, and wherein the core bolt head 140 of the core bolt 130 is received in the countersink 119. In another example, the sleeve head 118 is a crowned sleeve head and the core bolt head 140 is a countersunk core bolt head. In yet another example, the sleeve head 118 is a crowned sleeve head and the core bolt head 140 is a crowned core bolt head.

Examples of the subject matter disclosed herein may be described in the context of aircraft manufacturing and service method and aircraft. During pre-production, service method may include specification and design of aircraft and material procurement. During production, component and subassembly manufacturing and system integration of aircraft may take place. Thereafter, aircraft may go through certification and delivery to be placed in service. While in service, aircraft may be scheduled for routine maintenance and service. Routine maintenance and service may include modification, reconfiguration, refurbishment, etc. of one or more systems of aircraft.

Each of the processes of service method may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Aircraft produced by service method may include airframe with a plurality of high-level systems and interior. Examples of high-level systems include one or more of propulsion system, electrical system, hydraulic system, and environmental system. Any number of other systems may be included. Although an aerospace example is shown, the principles disclosed herein may be applied to other industries, such as the automotive industry. Accordingly, in addition to aircraft, the principles disclosed herein may apply to other vehicles, e.g., land vehicles, marine vehicles, space vehicles, etc.

The disclosed methods and systems for manufacturing a structure shown or described herein may be employed during any one or more of the stages of the manufacturing and service method. For example, components or subassemblies corresponding to component and subassembly manufacturing may be fabricated or manufactured in a manner similar to components or subassemblies produced while aircraft is in service. Also, one or more examples of the systems, methods, or combination thereof may be utilized during production stages component and subassembly manufacturing and system integration, for example, by substantially expediting assembly of or reducing the cost of aircraft. Similarly, one or more examples of the systems or method realizations, or a combination thereof, may be utilized, for example and without limitation, while aircraft is in service and/or during maintenance and service.

The disclosed methods and systems for manufacturing a structure are described in the context of an aircraft. However, one of ordinary skill in the art will readily recognize that the disclosed methods and systems for manufacturing a structure may be utilized for a variety of applications. For example, the disclosed methods and systems for manufacturing a structure may be implemented in various types of vehicles including, e.g., helicopters, watercraft, passenger ships, automobiles, and the like.

Although various examples of the disclosed methods and systems for manufacturing a structure have been shown and described, modifications may occur to those skilled in the art upon reading the specification. The present application includes such modifications and is limited only by the scope of the claims.

What is claimed is:

1. A blind fastener comprising:
   a sleeve defining a sleeve central axis and comprising:
      a sleeve shank having a distal end portion and a proximal end portion axially opposed from the distal end portion; and
      a stop connected to the distal end portion of the sleeve shank,
      wherein the sleeve defines an eccentric through-bore that extends along a through-bore axis from the proximal end portion of the sleeve shank to the distal end portion of the sleeve shank;
   a core bolt at least partially received in the eccentric through-bore of the sleeve, the core bolt defining a core bolt central axis and comprising:
      a core bolt shank having a distal end portion, a proximal end portion axially opposed from the distal end portion, and a threaded portion between the distal end portion and the proximal end portion; and
      a core bolt head connected to the proximal end portion of the core bolt shank; and
   an eccentric nut threaded into engagement with the threaded portion of the core bolt shank such that the eccentric nut is configured to initially rotate with the core bolt when the core bolt is rotated in a tightening direction, wherein the eccentric nut comprises a body defining a threaded eccentric through-bore, wherein the stop of the sleeve axially protrudes from the distal end portion of the sleeve shank toward the distal end portion of the core bolt shank, wherein, in conjunction with further rotation of the core bolt in the tightening direction, the eccentric nut contacts the stop which prevents the eccentric nut from rotating 360° and causes axial movement of the eccentric nut toward the core bolt head.

2. The blind fastener of claim 1, wherein the sleeve central axis of the sleeve extends from the proximal end portion of the sleeve shank to the distal end portion of the sleeve shank, wherein the through-bore axis is laterally displaced from the sleeve central axis of the sleeve by a distance of at least 0.5 mm.

3. The blind fastener of claim 1, wherein the stop axially protrudes from the distal end portion of the sleeve shank along a protruding axis that extends from the proximal end portion of the sleeve shank to the distal end portion of the sleeve shank, wherein the protruding axis is laterally displaced from the through-bore axis.

4. The blind fastener of claim 3, wherein the stop has a protruding length along the protruding axis, and wherein the protruding length is at least 1 mm.

5. The blind fastener of claim 1, wherein the eccentric through-bore defines a cross-sectionally thicker wall portion of the sleeve shank and a cross-sectionally thinner wall portion of the sleeve shank, and wherein the stop is connected to the cross-sectionally thicker wall portion of the sleeve shank.

6. The blind fastener of claim 1, wherein the sleeve shank and the stop comprise a single monolithic body.

7. The blind fastener of claim 1, wherein the sleeve further comprises a sleeve head connected to the proximal end portion of the sleeve shank.

8. The blind fastener of claim 1, wherein the core bolt central axis of the core bolt is aligned with the through-bore axis.

9. The blind fastener of claim 1, wherein the core bolt shank and the core bolt head comprise a single monolithic body.

10. The blind fastener of claim 1, wherein the threaded portion of the core bolt shank extends to the distal end portion of the core bolt shank.

11. The blind fastener of claim 1, wherein the core bolt further comprises a mechanism associated with the core bolt head to permit torquing of the core bolt.

12. The blind fastener of claim 11, wherein the mechanism is recessed into the core bolt head.

13. The blind fastener of claim 1, wherein:
   the eccentric through-bore defines a cross-sectionally thicker wall portion of the sleeve shank and a cross-sectionally thinner wall portion of the sleeve shank,
   the eccentric nut defines a threaded through-bore, and
   the threaded through-bore defines a cross-sectionally thicker wall portion of the eccentric nut and a cross-sectionally thinner wall portion of the eccentric nut.

14. The blind fastener of claim 13, wherein, while the eccentric nut is in an initial configuration, the cross-sectionally thicker wall portion of the eccentric nut is at least initially aligned with the cross-sectionally thicker wall portion of the sleeve shank.

15. The blind fastener of claim 13, wherein the eccentric nut comprises a secondary stop.

16. The blind fastener of claim 15, wherein the secondary stop is connected to the cross-sectionally thinner wall portion of the eccentric nut.

17. The blind fastener of claim 1 wherein:
   an external surface of the sleeve shank of the sleeve defines a maximum radius with respect to the sleeve central axis of the sleeve, when the eccentric nut is in an initial configuration, the eccentric nut is contained within the maximum radius, and when the eccentric nut is in a deployed configuration, a portion of the eccentric nut protrudes outside of the maximum radius.

18. The blind fastener of claim 17, wherein the portion of the eccentric nut that protrudes outside of the maximum radius when the eccentric nut is in a deployed configuration protrudes at least 4 mm beyond the maximum radius.

19. The blind fastener of claim 1, wherein, after at least 45 degrees of rotation of the core bolt about the core bolt central axis in the tightening direction, the eccentric nut engages the stop connected to the distal end portion of the sleeve shank.

20. The blind fastener of claim 19, wherein, after the eccentric nut engages the stop, further rotation of the core bolt about the core bolt central axis in the tightening direction causes axial movement of the eccentric nut toward the core bolt head along the core bolt central axis.

21. The blind fastener of claim 1, wherein, after at least 90 degrees and at most 720 degrees of rotation of the core bolt about the core bolt central axis in the tightening direction, the eccentric nut engages the stop connected to the distal end portion of the sleeve shank.

22. The blind fastener of claim 1, wherein the core bolt shank further comprises a non-threaded portion between the proximal end portion and the threaded portion, the threaded portion extending to the distal end portion.

23. A blind fastener comprising:
a sleeve defining a sleeve central axis and comprising:
  a sleeve shank having a distal end portion and a proximal end portion axially opposed from the distal end portion; and
  a stop connected to the distal end portion of the sleeve shank,
  wherein the sleeve defines an eccentric through-bore that extends along a through-bore axis from the proximal end portion of the sleeve shank to the distal end portion of the sleeve shank;
a core bolt at least partially received in the eccentric through-bore of the sleeve, the core bolt defining a core bolt central axis and comprising:
  a core bolt shank having a distal end portion, a proximal end portion axially opposed from the distal end portion, and a threaded portion between the distal end portion and the proximal end portion; and
  a core bolt head connected to the proximal end portion of the core bolt shank; and
an eccentric nut threaded into engagement with the threaded portion of the core bolt shank such that the eccentric nut is configured to initially rotate with the core bolt when the core bolt is rotated about the core bolt central axis in a tightening direction, wherein the eccentric nut comprises a body defining a threaded eccentric through-bore, wherein the stop of the sleeve axially protrudes from the distal end portion of the sleeve shank toward the distal end portion of the core bolt shank, wherein, in conjunction with further rotation of the core bolt in the tightening direction, the eccentric nut contacts the stop and the stop prevents the eccentric nut from rotating 360° with the core bolt which causes axial movement of the eccentric nut toward the core bolt head.

24. The blind fastener of claim 23, wherein, after at least 90 degrees and at most 720 degrees of rotation of the core bolt about the core bolt central axis in the tightening direction, the eccentric nut engages the stop connected to the distal end portion of the sleeve shank.

25. A blind fastener comprising:
a sleeve defining a sleeve central axis and comprising:
  a sleeve shank having a distal end portion and a proximal end portion axially opposed from the distal end portion; and
  a stop connected to the distal end portion of the sleeve shank,
  wherein the sleeve defines an eccentric through-bore that extends along a through-bore axis from the proximal end portion of the sleeve shank to the distal end portion of the sleeve shank;
a core bolt at least partially received in the eccentric through-bore of the sleeve, the core bolt defining a core bolt central axis and comprising:
  a core bolt shank having a distal end portion, a proximal end portion axially opposed from the distal end portion, and a threaded portion between the distal end portion and the proximal end portion; and
  a core bolt head connected to the proximal end portion of the core bolt shank; and
an eccentric nut threaded into engagement with the threaded portion of the core bolt shank such that the eccentric nut is configured to initially rotate with the core bolt when the core bolt is rotated in a tightening direction, wherein the eccentric nut comprises a body defining a threaded eccentric through-bore, wherein the stop of the sleeve axially protrudes from the distal end portion of the sleeve shank toward the distal end portion of the core bolt shank, wherein, in conjunction with further rotation of the core bolt in the tightening direction, the eccentric nut contacts the stop which prevents the eccentric nut from rotating 360° and causes axial movement of the eccentric nut toward the core bolt head, and
wherein the eccentric through-bore defines a cross-sectionally thicker wall portion of the sleeve shank and a cross-sectionally thinner wall portion of the sleeve shank, and wherein the stop is connected to the cross-sectionally thicker wall portion of the sleeve shank, and
wherein, after at least 45 degrees of rotation of the core bolt about the core bolt central axis in the tightening direction, the eccentric nut engages the stop connected to the distal end portion of the sleeve shank.

* * * * *